Sept. 4, 1923.
W. G. BEATTY
1,466,782
TRANSMISSION GEAR
Filed Jan. 4, 1922
2 Sheets-Sheet 1
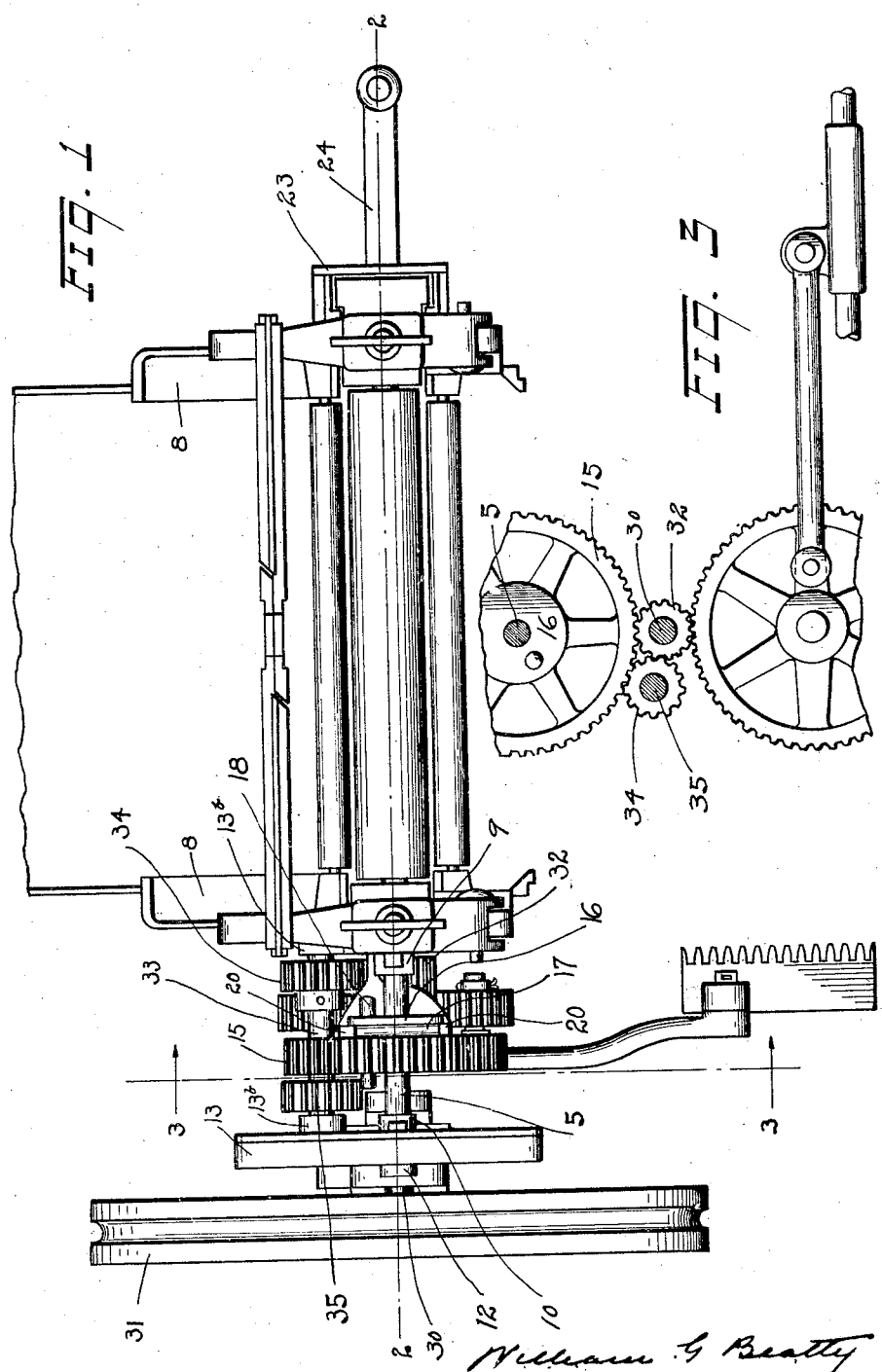

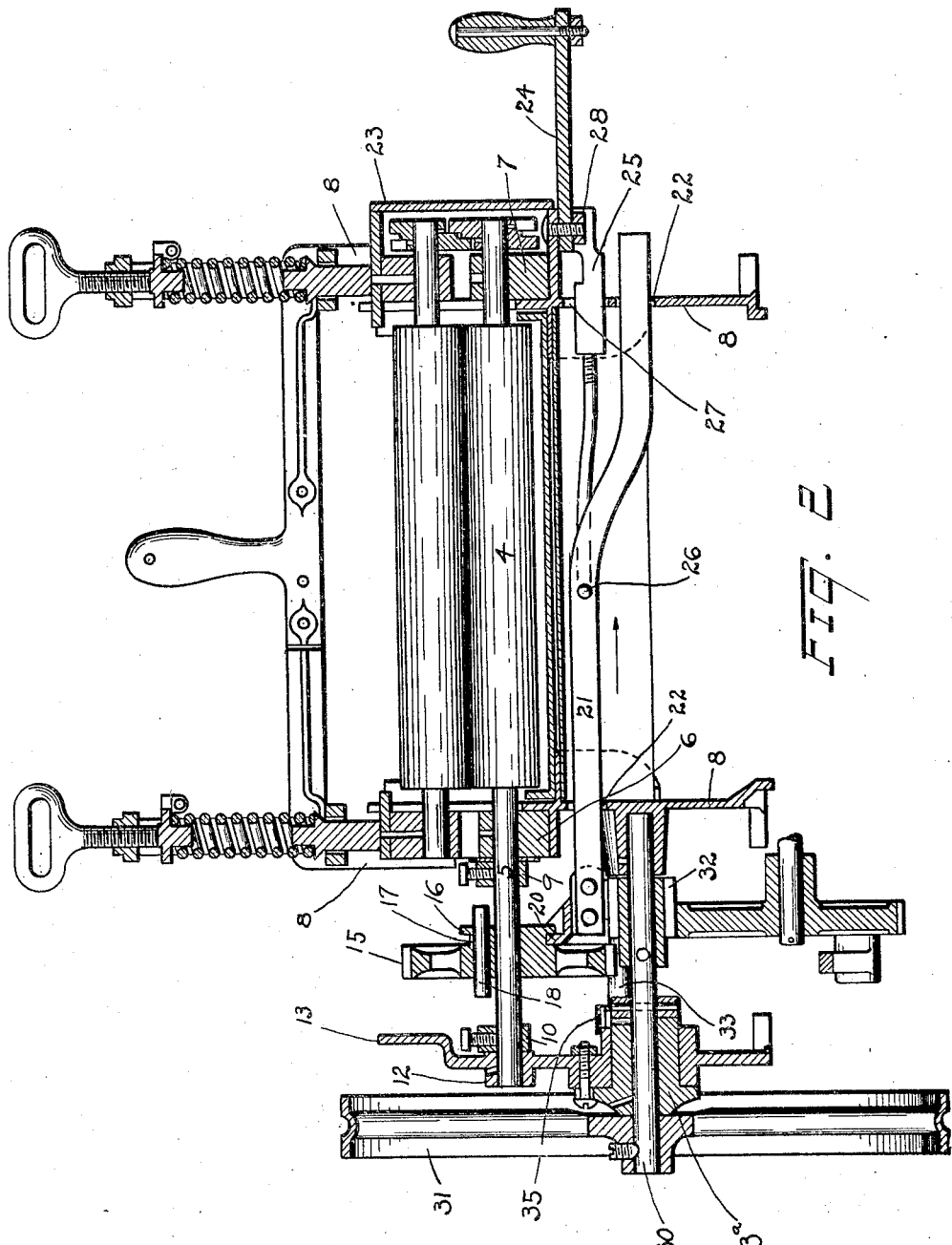

Patented Sept. 4, 1923.

1,466,782

UNITED STATES PATENT OFFICE.

WILLIAM GEORGE BEATTY, OF FERGUS, ONTARIO, CANADA.

TRANSMISSION GEAR.

Application filed January 4, 1922. Serial No. 527,027.

*To all whom it may concern:*

Be it known that I, WILLIAM GEORGE BEATTY, of the town of Fergus, in the county of Wellington and Province of Ontario, Dominion of Canada, have invented certain new and useful Improvements in Transmission Gears; and I hereby declare that the following is a full, clear, and exact description of the same.

This invention relates to a transmission gear comprising a spur wheel loosely mounted on a driven shaft and selectively movable into and out of mesh either with a pinion fixed on and rotatable with the driving shaft, or a reversing pinion fixed on and rotatable with a counter shaft having a driving pinion constantly in mesh with the pinion of the driving shaft, or into a neutral position between these pinions, suitable provision being made by which the spur wheel effects the revolution of the driven shaft when in mesh either with the pinion on the driving shaft or the reversing pinion on the counter shaft, and it relates more particularly to the shift-means by which the spur wheel can be selectively brought into mesh either with the pinion on the driving shaft, or the reversing pinion on the counter shaft, or into the neutral position in which it will not be in mesh with either of them, this means consisting essentially of a yoke embracing the hub of the spur wheel and provided with an elongated arm movable axially in a fixed path approximately parallel with the driven shaft and actuated by a bell crank lever having an oscillating connection with the arm.

For the purpose of explaining one use of the transmission gear, the invention is shown in connection with a wringer apparatus in which:

Fig. 1 is a plan view of the wringer and transmission gear.

Fig. 2 is a transverse sectional elevation on the line 2—2 Fig. 1, and

Fig. 3 is a fragmentary cross sectional view on the line 3—3 Fig. 1.

The wringer roller 4 is provided with a shaft 5 journalled in suitable bearings 6, 7 and 12. The bearings 6 and 7 are mounted in standards 8 bolted or otherwise fastened to the bed plate or base of the apparatus and forming part of the main frame of the wringer, and the bearing 12 is formed in a standard 13, bolted or otherwise fastened to the bed plate or base. The standard 13 is in parallel relation with and sufficiently spaced from the adjacent standard 8, for the shifting movement of the spur wheel 15. The spur wheel 15 is loosely mounted on the shaft 5 between the bearings 6 and 12 and its hub 16 is formed with a circumferential groove 17. Extending transversely through the spur wheel 15 and hub 16 is a pin 18 which projects beyond the spur wheel and its hub to engage either of two clutch members 9 and 10 on the shaft 5.

The clutch member 9 is arranged on the shaft 5 adjacent to the bearing 6 and the clutch member 10 is arranged on the shaft 5 adjacent to the bearing 12, the distance between the inner faces of the clutch members being greater than the length of the clutch pin 18, so that when the spur wheel is in a neutral position, or is only partly engaged with either the driving pinion or reversing pinion hereinafter described, the clutch pin 18 will be entirely clear of the two clutch members.

Loosely embracing the hub 16 and entered in the groove 17 is a shift yoke 20, provided with an arm 21 movable lengthwise through guideways 22 in the standards 8 in a plane substantially parallel to the shaft 5. The bearing 7 is enclosed by a bracket 23 forming part of or secured to the adjacent standard 8 and fulcrumed to the bracket 23 is a bell crank lever 24, to which is knuckled one end of a connecting rod 25. The other end of the connecting rod 25 is knuckled, as shown at 26, to the arm 21, approximately intermediate the standards 8. The connecting rod 25 extends through a laterally elongated aperture 27 in the adjacent standard 8 for its oscillating movement as the bell crank lever 24 turns on its fulcrum connection 28 with the bracket 23. To provide a clearance between the arm 21 and the connecting rod 25, the arm 21, as shown in Fig. 2, is bent downwardly into a plane below that of the connecting rod 25, but this arrangement may be varied within the scope of the claims without departing from the principle of the invention.

Journalled in bearings 13$^a$ in the standard 13 and in the adjacent standard 8 is a driving shaft 30 on which is fixed a grooved wheel 31. Fixed on the driving shaft 30, below the clutch member 9 is a driving pinion 32 with which the spur wheel 15 is adapted to mesh. When the spur wheel 15 is shifted into mesh with the driving pinion 32, the clutch pin 18 engages with the clutch member 9 and causes the rotation of the shaft 5 and roller 4 in a forward direction.

Journalled in bearings 13ᵇ in the standard 13 and the adjacent standard 8 is a counter shaft 33 on which is fixed a driven pinion 34 constantly in mesh with the driving pinion 32 and also mounted on the counter shaft 33 is a reversing pinion 35, spaced from the driven pinion 34 a distance greater than the width of the spur wheel 15, to provide a neutral position for the spur wheel when out of mesh with both the driving pinion 32 and the reversing pinion 35.

When the bell crank lever 24 is operated to move the arm 21 and yoke 20 to their limit of motion in the direction of arrow shown in Figure 2, the spur wheel 15 is shifted into mesh with the driving pinion 32 and during its rotation the clutch pin 18 engaging with the clutch member 9, effects the revolution of the shaft 5 and roller 4.

The meshing of the driven pinion 34 with the driving pinion 32 causes the continuous revolution of the shaft 33 and the reversing pinion 35. When the bell crank lever 24 is operated to move the arm 21 and yoke 20 to their limit of motion in the opposite direction to the arrow shown in Fig. 2, the spur wheel 15 is brought into mesh with the reversing pinion 35 and the clutch pin 18 is engaged with the clutch member 10 to cause the revolution of the shaft 5 and roller 4 in the reverse direction.

When the spur wheel 15 is in the neutral position, shown in Fig. 2, the driving shaft 30, driving pinion 32, counter shaft 33 and the pinions 34 and 35, can continue their rotation without imparting motion to the shaft 5 and roller 4.

By so spacing the clutch members 9 and 10, that the spur wheel 15 can become partly engaged with either the driving pinion 32 or reversing pinion 35 before the clutch pin will be in position to come into engagement with the corresponding clutch member, the direction of rotation of the spur wheel can be positively changed before it again picks up its load.

Partially enclosing the arm 21, and connecting rod 25, is a guard 36, which protects them from the water descending from the wringer rollers.

Having thus fully described my invention, what I claim as new and desire to secure by Letters Patent is:

1. A transmission gear comprising a driving shaft, a pinion on the driving shaft revoluble therewith, a counter shaft, a pinion on the counter shaft in mesh with the pinion on the driving shaft, a second pinion on the counter shaft spaced from the first mentioned one, a driven shaft, a spur wheel loosely mounted on the driven shaft and selectively movable into mesh with either the pinion on the driving shaft or the second mentioned pinion on the counter shaft or into a neutral position between them, clutch members carried by the spur wheel, and clutch members on the driven shaft engageable with the clutch members of the spur wheel.

2. A transmission gear comprising a driving shaft, a pinion on the driving shaft revoluble therewith, a counter shaft, a pinion on the counter shaft in mesh with the pinion on the driving shaft, a second pinion on the counter shaft spaced from the first mentioned one, a driven shaft, a spur wheel loosely mounted on the driven shaft and selectively movably into mesh with either the pinion on the driving shaft or the second mentioned pinion on the counter shaft or into a neutral position between them, clutch members carried by the spur wheel, and clutch members on the driven shaft engageable with the clutch members of the spur wheel, said last mentioned pinions being so arranged with relation to the clutch members on the driven shaft that the spur wheel will be fully in mesh with them for the revolution of the spur wheel before the clutch members engage.

Dated at the said town of Fergus this 20th day of December, A. D. 1921.

WILLIAM GEORGE BEATTY.

Witnesses:
J. A. WILSON,
STANLEY RICHES.